3,138,592
2-ARYL-4,7-DIAMINO-PTERIDINE-6-CARBOXAMIDES

Thomas S. Osdene, West Chester, and Arthur A. Santilli, Ardmore, Pa., assignors to American Home Products Corporation, New York, N.Y., a corporation of Delaware
No Drawing. Filed Oct. 22, 1962, Ser. No. 232,264
9 Claims. (Cl. 260—247.5)

This invention relates to novel pteridine compounds having useful pharmacological properties. These compounds have the formula:

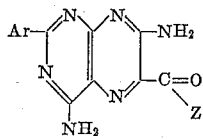

wherein Ar is phenyl or a phenyl radical bearing a substituent selected from the group consisting of halogen, lower alkyl and lower alkoxy, Z is a substituent selected from the group consisting of:

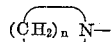

where $n$ is an integer ranging from 4 to 6;

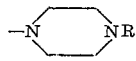

where R is lower alkyl or lower hydroxyalkyl; and

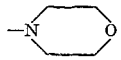

By lower alkyl and lower alkoxy are meant straight-chained or branched compounds having from 1 to 4 carbon atoms in the chain.

The compounds of this invention exhibit diuretic and natriuretic activities. Some of them exhibit also antiviral and antiinflammatory properties. Others have antibacterial properties. By reason of these properties and because of their low toxicities, the compounds sought to be patented are valuable in both human and veterinary medicines.

The compounds of this invention may be prepared by heating together in an anhydrous neutral polar solvent and in the presence of a basic catalyst, a 4,6-diamino-5-nitroso-2-aryl-pyrimidine with a reactant selected from the group consisting of 1-cyanoacetyl cyclic imines, 1-cyanoacetyl-4-substituted piperazines and 1-cyanoacetyl morpholines, which reactant is generally represented by the formula:

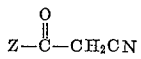

This reaction proceeds as follows:

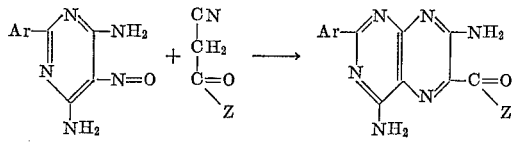

Useful neutral polar solvents for this reaction are methanol, ethanol, propanol and butanol, glycol ethers such as 2-methoxyethanol, 2-ethoxyethanol, methoxy and ethoxy-propanols, and amides such as dimethylformamide, diethylformamide and dimethyl acetamide. Suitable basic catalysts for promoting the above reaction include the alkali metals, their alkoxides and their alkoxyalkoxides. Preferred among these are sodium metal, sodium methoxide, potassium ethoxide and sodium alpha-ethoxy ethoxide. The reaction temperatures range from about 60° to 200° C. and the reaction is generally conducted at or near the boiling temperature of the selected solvent under autogenous pressure. The product is purified preferably by dissolving it in dimethylformamide and by precipitating it with the addition of water.

The following examples illustrate the best mode of carrying out the invention. Temperatures are given in degrees centigrade.

Example 1

A mixture of 19.3 g. of pyrrolidine, 30.5 g. of ethyl cyanoacetate and 50 ml. of ethanol is refluxed for 5 hours. The solvent is removed on a rotary evaporator, leaving a brown solid, M.P. 64–67°.

Recrystallization from ethyl acetate affords 1-cyanoacetylpyrrolidine, M.P. 74–75°.

*Analysis.*—Calculated: C=60.85; H=7.30; N=20.28. Found: C=60.91; H=7.26; N=20.09.

Example 2

A mixture of 49.6 g. of hexamethyleneimine, 56.5 g. of ethyl cyanoacetate and 120 ml. of absolute ethanol is refluxed for 6½ hours and allowed to stand overnight at room temperature. The solvent is removed on a rotary evaporator leaving an oil which on cooling partially solidifies. The solid is removed by filtration and washed with petroleum ether, leaving a crude product melting at 59–63° C.

Recrystallization from a mixture of cyclohexane and ethanol affords 1-cyanoacetylhexamethyleneimine, M.P. 73.5–75°.

*Analysis.*—Calculated: C=65.03; H=8.49; N=16.85; Found: C=65.19; H=8.60; N=17.10.

Example 3

To a stirred solution of 0.2 g. of sodium metal in 500 ml. of absolute ethanol is added 6.45 g. of 4,6-diamino-5-nitroso-2-phenylpyrimidine. The mixture is brought to the boiling point and 5.7 g. of 1-cyanoacetylpyrrolidine prepared in Example 1, is added. Boiling under reflux is continued for 15 minutes during which time a brownish-yellow precipitate is deposited. Purification of the product by dissolving it in dimethylformamide followed by precipitation with water affords 1-(4,7-diamino-2-phenyl-6-pteridylcarbonyl)pyrrolidine, M.P. 340–342°.

*Analysis.*—Calculated: C=60.88; H=5.11; N=29.21. Found: C=60.83; H=5.55; N=29.03.

Example 4

To a stirred solution of 0.2 g. of sodium metal in 500 ml. of absolute ethanol is added 6.45 g. of 4,6-diamino-5-nitroso-2-phenylpyrimidine. The mixture is boiled under reflux and when a solution is obtained, 5.3 g. of 1-cyanoacetylpiperidine is added. Boiling is continued for a total of 30 minutes during which time a yellow crystalline material is deposited. The reaction mixture is cooled and the precipitate removed by filtration. The product is purified by recrystallization from aqueous ethanol, affording 1-(4,7-diamino-2-phenyl-6-pteridylcarbonyl)piperidine, M.P. 273–275°.

*Analysis.*—Calculated: C=61.87; H=5.49; N=28.06. Found: C=62.02; H=5.76; N=27.84.

Example 5

To a stirred solution of 0.2 g. of sodium metal in 500 ml. of absolute ethanol is added 6.45 g. of 4,6-diamino-5-nitroso-2-phenylpyrimidine. The mixture is brought to the boiling point and 5.8 g. of 1-cyanoacetylhexamethyleneimine prepared in Example 2 is added. Boiling is continued for 30 minutes during which time yellow crystals separate from the solution. After cooling, the precipitate is removed by filtration and the product crystallized from ethanol affording 1-(4,7-diamino-2-phenyl-6-pteridylcarbonyl)hexamethyleneimine, M.P. 266–267.5°.

*Analysis.*—Calculated: C=62.79; H=5.82; N=26.98. Found: C=62.96; H=5.94; N=26.82.

*Example 6*

A mixture of 50 g. of N-methylpiperazine, 56.5 g. of ethyl cyanoacetate and 120 ml. of absolute ethanol is boiled under reflux for 5 hours. The solvent is removed on a rotary evaporator. The crystalline mass which forms after cooling is removed by filtration and washed with cold ethanol followed by petrol. Recrystallization of the product (33 g., M.P. 111–112°) from cyclohexane affords 1-cyanoacetyl-4-methylpiperazine, M.P. 113–114°.

*Analysis.*—Calculated: C=57.46; H=7.84; N=25.13. Found: C=57.59; H=8.08; N=24.96.

*Example 7*

A mixture of 26 g. of beta-hydroxyethylpiperazine, 22.6 g. of ethyl cyanoacetate and 60 ml. of absolute ethanol is boiled under reflux for 6 hours. The solvent is removed on a rotary evaporator and the thick oily residue partially solidifies on standing overnight. The solid is removed by filtration. Recrystallization from benzene gives 1-cyanoacetyl-4-(beta-hydroxyethyl)piperazine, M.P. 84–85°.

*Analysis.*—Calculated: C=54.80; H=7.67; N=21.31. Found: C=55.09; H=7.57; N=21.41.

*Example 8*

To a stirred solution of 0.2 g. of sodium metal in 500 ml. of absolute ethanol is added 6.45 g. of 4,6-diamino-5-nitroso-2-phenyl pyrimidine. The mixture is boiled and 5.85 g. of 1-cyanoacetyl-4-methylpiperazine prepared as in Example 6 is added. Boiling under reflux is continued for 1 hour during which time a brown precipitate deposits out of solution. After cooling, the precipitate is removed by filtration, and recrystallization from aqueous ethanol affords 1 - (4,7-diamino-2-phenyl-6-pteridylcarbonyl)-4-methylpiperazine, M.P. 270.5–272°.

*Analysis.*—Calculated: C=59.33; H=5.53; N=30.75. Found: C=59.01; H=5.58; N=30.62.

*Example 9*

To a stirred solution of 0.2 g. of sodium metal in 500 ml. of absolute ethanol is added 6.45 g. of 4,6-diamino-5-nitroso-2-phenylpyrimidine. The mixture is brought to boiling and 6.9 g. of 1-cyanoacetyl-4-(beta-hydroxyethyl)piperazine prepared as in Example 7 is added. Boiling under reflux is continued for a total of 15 minutes during which time a yellow, crystalline product deposits out of solution. The reaction mixture is cooled in ice and filtered. Purification of the product by recrystallization from aqueous ethanol affords 1-(4,7-diamino-2-phenyl-6-pteridylcarbonyl)-4-(beta-hydroxyethyl)piperazine, M.P. 279–280°.

*Analysis.*—Calculated: C=57.85; H=5.62; N=28.41. Found: C=58.08; H=5.65; N=28.38.

*Example 10*

To a stirred solution of 0.2 g. of sodium metal in 500 ml. of absolute ethanol is added 7.48 g. of 4,6-diamino-2-(p-chlorophenyl)-5-nitrosopyrimidine. The mixture is brought to boiling point and 6.9 g. of 1-cyanoacetyl-4-(beta-hydroxyethyl)piperazine is added. Boiling under reflux is continued for a total of 20 minutes during which time a precipitate deposits. The reaction mixture is cooled in ice and filtered. Purification of the product by recrystallization from aqueous dimethylformamide affords 1 - [4,7-diamino-2-(p-chlorophenyl)-6-pteridylcarbonyl]-4-(beta-hydroxyethyl)piperazine, M.P. 292–293°.

*Analysis.*—Calculated: C=53.21; H=4.94; N=26.13; Cl=8.27. Found: C=53.28; H=4.77; N=26.06; Cl=8.1.

*Example 11*

1 - [4,7-diamino - 2 - (p-anisyl)-6-pteridylcarbonyl]-4-methylpiperazine is prepared by the reaction of 7.35 g. of 4,6-diamino-2-(p-anisyl)-5-nitrosopyrimidine with 5.85 g. of 1-cyanoacetyl-4-methylpiperazine as in Example 8.

*Example 12*

1-[4,7-diamino-2-(p-tolyl)-6-pteridylcarbonyl]-4-(beta-hydroxyethyl)piperazine is prepared by the reaction of 6.8 g. of 4,6-diamino-5-nitroso-2-(p-tolyl)pyrimidine with 6.9 g. of 1-cyanoacetyl-4-(beta-hydroxy-ethyl)piperazine as in Example 9.

*Example 13*

1 - [4,7 - diamino - 2 - (o-tolyl)-6-pteridylcarbonyl]-4-methylpiperazine is prepared by the reaction of 6.87 g. of 4,6-diamino-5-nitroso-2-(o-tolyl)pyrimidine with 5.85 g. of 1-cyanoacetyl-4-methylpiperazine as in Example 8.

*Example 14*

1 - [4,7-diamino-2-(p-tolyl)-6-pteridylcarbonyl]pyrrolidine is prepared by the reaction of 4,6-diamino-5-nitroso-2-(p-tolyl)pyrimidine with 1-cyanoacetylpyrrolidine as in Example 3.

*Example 15*

1-[4,7-diamino-2-(p-anisyl)-6-pteridylcarbonyl]piperidine is prepared by the reaction of 4,6-diamino-2-(p-anisyl)-5-nitrosopyrimidine with 1-cyanoacetylpiperidine as in Example 4.

*Example 16*

1-[4,7 - diamino-2-(p - chlorophenyl-6-pteridylcarbonyl] hexamethyleneimine is prepared by the reaction of 4,6-diamino-2-(p-chlorophenyl)-5-nitrosopyrimidine with 1-cyanoacetylhexamethyleneimine as in Example 5.

*Example 17*

1-[4,7-diamino-2-(o-tolyl)-6-pteridylcarbonyl]piperidine is prepared by the reaction of 4,6-diamino-5-nitroso-2-(o-tolyl)pyrimidine with 1-cyanoacetylpiperidine as in Example 4.

*Example 18*

To a stirred solution of 0.2 g. of sodium metal in 500 ml. of absolute ethanol is added 6.45 g. of 4,6-diamino-5-nitroso-2-phenylpyrimidine and the mixture is brought to boiling point, when 5.39 g. of 4-cyanoacetylmorpholine is added. Boiling under reflux is continued for a total of 15 minutes during which period a yellow crystalline product deposits out of solution. The reaction mixture is cooled in ice and filtered. The product is purified by dissolution in dimethylformamide followed by precipitation with water to give 4-(4,7-diamino-2-phenyl-6-pteridylcarbonyl)morpholine, M.P. 327–329°.

*Analysis.*—Calculated: C=58.11; H=4.88; N=27.91. Found: C=58.34; H=4.93; N=27.83.

*Example 19*

To a stirred solution of 0.2 g. of sodium metal in 500 ml. of absolute ethanol is added 6.87 g. of 4,6-diamino-5-nitroso-2-(p-tolyl)-pyrimidine. The mixture is brought to boiling point and 5.39 g. of 4-cyanoacetyl morpholine is added. Boiling under reflux is continued for 40 minutes during which time a yellow crystalline material is deposited out of solution. The reaction mixture is cooled in ice and filtered. Purification of the product by dissolving it in dimethylformamide followed by precipitation with water affords 4-[4,7-diamino-2-(p-tolyl)-6-pteridylcarbonyl]morpholine, M.P. 338–339°.

*Analysis.*—Calculated: C=59.16; H=5.24; N=26.84. Found: C=59.06; H=5.36; N=26.78.

*Example 20*

4-[4,7 - diamino-2-(p-chlorophenyl)-6-pteridylcarbonyl] morpholine is prepared by the reaction of 4,6-diamino-2-

(p-chlorophenyl)-5-nitrosopyrimidine with 4-cyanoacetylmorpholine as in Example 18.

*Example 21*

4-[4,7-diamino-2-(p-anisyl) - 6 - pteridylcarbonyl]morpholine is prepared by the reaction of 4,6-diamino-2-(p-anisyl)-5-nitrosopyrimidine with 4-cyanoacetylmorpholine as in Example 19.

*Example 22*

4-[4,7 - diamino-2-(o-tolyl) - 6 - pteridylcarbonyl]morpholine is prepared by the reaction of 4,6-diamino-5-nitroso-2-(o-tolyl)pyrimidine with 4-cyanoacetylmorpholine as in Example 19.

The compounds of the invention may be administered parenterally or orally after being combined with suitable solvents, carriers or excipients.

We claim:
1. A compound having the formula:

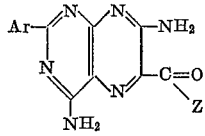

wherein Ar is selected from the group consisting of phenyl and phenyl bearing a substituent selected from the group consisting of halogen, lower alkyl and lower alkoxy, Z is a substituent selected from the group consisting of:

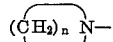

where $n$ is an integer ranging from 4 to 6;

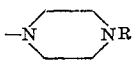

where R is selected from the group consisting of lower alkyl and lower hydroxyalkyl, and

2. 1 - (4,7-diamino-2-phenyl-6-pteridylcarbonyl)pyrrolidine.
3. 1-(4,7-diamino-2-phenyl - 6 - pteridylcarbonyl)piperidine.
4. 1-(4,7-diamino-2-phenyl - 6 - pteridylcarbonyl)hexamethyleneimine.
5. 1 - (4,7 - diamino - 2 - phenyl-6-pteridylcarbonyl)-4-methylpiperidine.
6. 1-(4,7-diamino - 2 - phenyl - 6 - pteridylcarbonyl)-4-(beta-hydroxyethyl)piperazine.
7. 1-[4,7-diamino-2-(p-chlorophenyl) - 6 - pteridylcarbonyl]-4-(beta-hydroxyethyl)piperazine.
8. 4-[4,7-diamino-2-phenyl-6-pteridylcarbonyl]morpholine.
9. 4-[4,7-diamino-2-(p-tolyl) - 6 - pteridylcarbonyl]morpholine.

References Cited in the file of this patent
UNITED STATES PATENTS

| | | |
|---|---|---|
| 2,975,180 | Osdene et al. | Mar. 14, 1961 |
| 3,028,387 | Weinstock | Apr. 3, 1962 |
| 3,040,031 | Dietrich | June 19, 1962 |